United States Patent [19]

Dickie et al.

[11] 3,992,477

[45] Nov. 16, 1976

[54] PROTECTIVE COATING COMPOSITION

[75] Inventors: Ray A. Dickie, Birmingham; Joseph C. Cassatta, Taylor, both of Mich.

[73] Assignee: Ford Motor Company, Dearborn, Mich.

[22] Filed: Dec. 31, 1974

[21] Appl. No.: 537,735

[52] U.S. Cl. .......................... 260/827; 204/159.15; 204/159.16; 204/159.17; 260/836; 260/837 R; 260/879; 260/885; 260/859 R; 260/953; 427/44; 427/250; 427/404; 427/407 R; 427/409; 428/522; 428/537; 428/442; 428/461; 428/463; 428/515

[51] Int. Cl.$^2$ ...................... C08L 31/02; C08F 8/00

[58] Field of Search .................. 204/159.15, 159.16, 204/159.17, 159.19; 260/827, 953, 885, 461; 427/44

[56] References Cited

UNITED STATES PATENTS

| | | | |
|---|---|---|---|
| 2,934,555 | 4/1960 | O'Brien et al. | 260/461 |
| 3,030,347 | 4/1962 | O'Brien et al. | 260/86.1 |
| 3,437,514 | 4/1969 | Burlant | 427/44 |
| 3,542,586 | 11/1970 | Aronoff et al. | 427/44 |

OTHER PUBLICATIONS

Gotoda et al., Radiation Curing of Mixtures of Diallyl Phthalate Prepolymer and Vinyl Monomer, JAERI, 5026, pp. 121–129(1970).

Primary Examiner—Richard B. Turer
Attorney, Agent, or Firm—Roger L. May; Keith L. Zerschling

[57] ABSTRACT

A radiation polymerizable protective coating composition or paint, coated articles bearing such a protective coating and processes for preparing such articles. The radiation polymerizable paint, on a non-polymerizable solvent, pigment, initiator and particulate filler-free basis consists essentially of a binder solution of: (1) an alpha-beta olefinically unsaturated organic resin containing between about .5 and about 5 units of olefinic unsaturation per 1,000 units of molecular weight; (2) a compound polymerizable with said resin upon exposure to ionizing radiation; and (3) between about 1.0 and about 15.0 parts per 100 parts of the total of said alpha-beta olefinically unsaturated resin and said compound polymerizable therewith of a triester of phosphoric acid bearing one or more sites of vinyl unsaturation. The composition exhibits excellent quality and good adhesion to a variety of substrates, in particular metals, including vapor deposited metals. Preferred articles bearing such a coating are prepared by: applying a base coat to a substrate and curing the same; vapor depositing a coating of a metal over the surface of the base coat; and applying to and curing on the surface of the deposited metal the radiation polymerizable topcoat, preferably with little or no pigment contained therein.

4 Claims, No Drawings

PROTECTIVE COATING COMPOSITION

This application relates to: radiation polymerizable coatings of excellent quality which display unusually good adhesion to a variety of substrates; coated articles bearing such a radiation polymerizable coating; and processes for preparing such articles.

More particularly, this application relates to radiation polymerizable coating compositions which are particularly suited as corrosion and abrasion resistant protective coatings for vapor deposited metal surfaces as well as to articles comprising such a vapor deposited metal surface bearing the protective coating and processes for preparing the same. Such protectively coated, vapor deposited metal bearing articles are a particularly preferred embodiment of the invention since they are suitable for use as a substitute for plated metal surfaces used for trim or brightwork on the exterior of automobiles.

Still more particularly, this application relates to an improvement of coating compositions which generally, exclusive of nonpolymerizable solvents, pigments and other non-reactive components, consist essentially of a film forming solution of: (1) an alpha-beta olefinically unsaturated organic resin containing between about 0.5 and about 5 units of olefinic unsaturation per 1,000 units of molecular weight; and (2) a compound polymerizable therewith upon exposure to ionizing radiation. Representative of such radiation polymerizable coating compositions are those disclosed in the following U.S. Pat. Nos.: 3,437,514; 3,437,512; 3,437,513; 3,528,844; 3,542,586; 3,542,587; 3,577,262; 3,577,263; 3,577,264; 3,577,265; 3,585,065; 3,586,528; 3,586,530; 3,632,399; 3,641,210; 3,642,939; 3,649,337; 3,650,811; 3,650,812; 3,650,813; 3,660,143; 3,660,144; 3,660,145; and 3,660,471; Although the compositions disclosed in each of these patents will be discussed further hereinafter, the complete disclosure of each of the patents is incorporated herein by reference.

The coatings disclosed by the above patents may be classified as finish coatings and, as such, are required to provide not only an excellent appearance, but also physical properties which will enable the coated part to withstand the elements to which it may be exposed. Although the coatings are suitable to provide an external finish on a variety of substrates, they do not adhere well to metal or metal bearing substrates such as those having vapor deposited metal surfaces nor do they provide adequate corrosion protection when applied to such surfaces. The coating compositions of this invention solve such problems by providing improved corrosion resistance and adhesion, particularly when applied to surface bearing vapor deposited metal coatings.

BRIEF DESCRIPTION OF THE INVENTION

The coating compositions of this invention, on a non-polymerizable solvent pigment, initiator and particulate filler-free basis consist essentially of a binder solution of: (1) an alpha-beta olefinically unsaturated organic resin containing between about 0.5 and about 5 units of olefinic unsaturation per 1,000 units of molecular weight; (2) a compound polymerizable with said resin upon exposure to ionizing radiation; and (3) between about 1.0 and about 15.0 parts per 100 parts of the total of said alpha-beta olefinically unsaturated resin and said compound polymerizable therewith of a triester of phosphoric acid bearing one or more sites of vinyl unsaturation and having the formula:

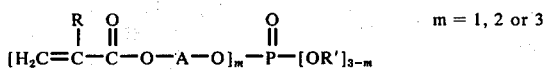

where:
 R = H, Cl or $CH_3$
 A = $C_nH_{2n}$, $2 \leq n \leq 6$
 R' = $C_1$ to $C_4$ alkyl or $C_1$ to $C_4$ chloro- or bromo-alkyl These coating compositions, which are radiation polymerizable, are preferably cured by exposure to ionizing radiation or ultraviolet radiation. The coating compositions provide an excellent protective surface which adheres well to a variety of substrates, in particular metals and vapor deposited metals, and, thus, can be employed in the preparation of a wide variety of articles. One such preferred article or material, which is useful as a substitute for metal plated materials used for trim or brightwork on the exterior of automobiles, is prepared by: (1) vapor depositing a metal layer on the surface of a prepared substrate; (2) coating the deposited metal surface with the radiation polymerizable coating of this invention; and (3) curing the coating by exposure to radiation, preferably ionizing radiation or ultraviolet radiation.

The radiation polymerizable coating composition and the coated articles formed therefrom as well as the processes for preparing the same will be described more fully in the detailed description of the invention which follows.

DETAILED DESCRIPTION OF THE INVENTION

I. Radiation Polymerizable Coating Composition

In this application, the term "paint" is meant to include finely divided pigment and/or particulate filler as well as other additives in a film-forming, resin comprising, binder or the binder without pigment, particulate filler, and other additives. Thus, the binder which is ultimately converted to a weather and wear-resistant film can be all or virtually all that is used to form the film, or it can be a vehicle for pigment and other additives.

The radiation polymerizable coating compositions or paints of this invention, which overcome the deficiencies of prior art coatings, on a non-polymerizable solvent, pigment, initiator and particulate filler-free basis, consist essentially of a binder solution of: (1) an alpha-beta olefinically unsaturated organic resin containing between about .5 and about 5 units of olefinic unsaturation per 1,000 units of molecular weight; (2) a compound polymerizable with said resin upon exposure to ionizing radiation; and (3) between about 1.0 and about 15.0 parts per 100 parts of the total of said alpha-beta olefinically unsaturated resin and said compound polymerizable therewith of a triester of phosphoric acid bearing one or more sites of vinyl unsaturation and having the formula:

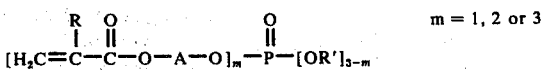

where:
 R = H, Cl or $CH_3$
 A = $C_nH_{2n}$, $2 \leq n \leq 6$

R' = $C_1$ - $C_4$ alkyl or
$C_1$ - $C_4$ bromo- or chloroalkyl

A. ALPHA-BETA OLEFINICALLY UNSATURATED RESINS

The term "alpha-beta olefinically unsaturated organic resin" as used herein means an organic resin having olefinic unsaturation provided by an alpha-beta olefinically unsaturated monomer. The term "alpha-beta unsaturation" as used herein includes both the olefinic unsaturation that is between two carbon atoms which are in the alpha and beta positions relative to an activating group such as a carboxyl group, e.g., the olefinic unsaturation of maleic anhydride, and the olefinic unsaturation between the two carbon atoms which are in the alpha and beta positions with respect to the terminus of an aliphatic carbon-to-carbon chain, e.g., the olefinic unsaturation of acrylic or methacrylic acid or styrene. The binder solution of the coating compositions of this invention preferably includes between about 90 and about 10 parts, preferably between about 80 and about 20 parts of such an alpha-beta olefinically unsaturated resin containing between about 0.5 and about 5 units, preferably between about 0.5 and about 3 units, of unsaturation per 1,000 units of molecular weight. The selection of the particular alpha-beta olefinically unsaturated organic resin will, of course, depend upon the particular selection of the compound polymerizable therewith as well as the type of substrate being coated, the intended use of the end product and the desired viscosity of the binder, keeping in mind the desired mode of application. The following discussion of alpha-beta olefinically unsaturated resins is presented as a summary of the various types of resins which may be employed in radiation curable paints known in the prior art and taught in the above-incorporated prior art patents. Of course, the particular details regarding the various prior art radiation curable compositions are more adequately described in the patent disclosures incorporated herein by reference.

U.S. Pat. No. 3,437,514 to Burlant discloses a number of preferred types of alpha-beta olefinically unsaturated resins useful in this invention, which types are generic to a number of resins disclosed by others of the patents listed above. One of these resins is of the vinyl resin type. The term "vinyl resin" as used in this context is one which is formed from "vinyl monomers" and which includes the requisite amount of alpha-beta olefinic unsaturation. The term "vinyl monomers" is intended to mean monomeric compounds having a

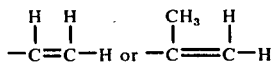

terminal group and excludes allylic compounds, resins and modified acrylic resins, the former meaning a resin formed exclusively of acrylic monomers and the latter meaning a resin formed from a major amount of acrylic monomers and a minor amount of non-acrylic monomers. The term "acrylic monomers" means an alpha-beta monounsaturated monocarboxylic acid or esters thereof and includes, but not by way of limitation, acrylic acid, alkylacrylic acids, e.g., methacrylic acids, monohydric and polyhydric alcohol esters of acrylic acid and alkylacrylic acids, e.g., glycidyl methacrylate, 2-hydroxethyl methacrylate, etc. These resins have a molecular weight in excess of about 1,000, commonly about 5,000 to about 25,000. Similar alpha-beta olefinically unsaturated vinyl monomer containing polymers are disclosed in U.S. Pat. Nos. 3,528,844; 3,542,586; 3,542,587; 3,577,265; 3,586,529; 3,586,528; 3,586,530; 3,641,210; and 3,642,939. All of these vinyl monomer containing polymers may be prepared by conventional free radical initiated copolymerization using two or more, preferably three or more, vinyl monomers at least one of which has a free or pendant functional group within its molecular structure, e.g., hydroxyethyl methacrylate. This functionality allows the polymer intermediate to then be reacted with various other monomers such as glycidyl methacrylate to provide the desired alpha-beta olefinic unsaturation.

A second type of alpha-beta olefinically unsaturated organic resin disclosed by U.S. Pat. No. 3,437,514 is a polyester having a molecular weight greater than 1,000 and preferably between about 2,000 and about 20,000. The preferred polyester is a copolymerization product of a polyhydric alcohol, and an acyclic, alpha-unsaturated alpha-beta dicarboxylic acid, and a cyclic aliphatic dicarboxylic acid. U.S. Pat. No. 3,577,262 also discloses such an alpha-beta olefinically unsaturated polyester. U.S. Pat. Nos. 3,649,337 and 3,660,371 disclose related unsaturated polyester resins formed by reacting an alpha-beta olefinically unsaturated, monocarboxy terminated, polyester with an epoxy functional graded-rubber particle.

A third type of unsaturated organic resin useful in this invention and taught by the Burlant patent is a silicone-modified organic resin comprising a polyester having incorporated therein a cyclic or acyclic siloxane which prior to reaction of incorporation has a reactive hydroxyl or hydrocarbonoxy group bonded to at least two of its silicon atoms. Such a resin can also be prepared by reacting a siloxane with a hydroxylated vinyl resin prepared by reacting vinyl monomers, at least one of which is a hydroxylated monomer. Various modifications of resins of this type are taught in U.S. Pat. Nos. 3,437,512; 3,437,513; 3,650,811; 3,650,812; 3,650,813; 3,577,264 and 3,632,399.

A fourth alpha-beta olefinically unsaturated organic resin disclosed by Burlant and useful in this invention is a urethane-modified organic polymer formed by reacting a diisocyanate monomer and an organic resin having in its molecular structure a plurality of hydrogen atoms which are labile with respect to an isocyanate group.

A final category of alpha-beta olefinically unsaturated organic resins disclosed by Burlant comprises epoxy resins having requisite amounts of unsaturation. Similar epoxy containing resins are also disclosed in U.S. Pat. Nos. 3,577,263 and 3,660,145.

Still other alpha-beta olefinically unsaturated resins are taught by several of the patents enumerated above. For example, both U.S. Pat. Nos. 3,660,144 and 3,660,145 teach alpha-beta olefinically unsaturated elastomeric particles of cross-linked acrylic polymer for use in radiation curable paints and U.S. Pat. No. 3,585,065 teaches an alpha-beta olefinically unsaturated siloxane resin for use in a film-forming binder system. Of course, the subject invention is not limited to the types of unsaturated resin summarized above, but may include any alpha-beta olefinically unsaturated organic resin having the requisite unsaturation and being polymerizable upon being subjected to ionizing radiation. It should also be appreciated that the radiation polymerizable paints of this inventon may also employ mixtures of the various alpha-beta olefinically unsaturated organic resins where desired for the particular application.

B. COMPOUND POLYMERIZABLE WITH ALPHA-BETA OLEFINICALLY UNSATURATED RESIN

The compound polymerizable by exposure to ionizing radiation with the alpha-beta olefinically unsaturated organic resin is included in the paint binder solution in an amount ranging between about 90 and about 10 parts, preferably between about 80 and about 20 parts. The compound is preferably a vinyl monomer as defined above or a mixture of vinyl monomers. The preferred vinyl monomers taught by the above patents are esters of $C_1$ - $C_8$ monohydric alcohols and acrylic or methacrylic acids, e.g., methylmethacrylate, ethyl acrylate, butyl acrylate, butyl methacrylate, octyl acrylate, 2-ethyl hexylacrylate, etc. Alcohols of higher carbon numbers, e.g., $C_9$ - $C_{15}$ as well as difunctional alcohols can also be used to prepare esters or diesters. Vinyl hydrocarbon monomers, e.g., styrene and alkylated styrenes such as vinyl toluene, alphamethyl styrene, etc., may also be used separately or in combination with the aforementioned vinyl monomers. In combination with the acrylate monomers and/or vinyl hydrocarbon monomers, there may be used minor amounts of other vinyl monomers such as nitriles, e.g., acrylonitrile, acrylamide or n-methylol carboxylates, e.g., vinyl acetate. Such vinyl monomers are useful in combination with each of the alpha-beta olefinically unsaturated resins discussed previously and taught by the various patents.

Other vinyl containing compounds which may be employed in combination with the alpha-beta olefinically unsaturated resins are divinyl monomers, trivinyl monomers, tetravinyl monomers and mixtures thereof. These di-, tri-, and tetravinyl compounds are preferably acrylates, methacrylates or vinyl hydrocarbons. The most preferred are esters of acrylic or methacrylic acids and polyhydric $C_2$ - $C_8$ alcohols, e.g., neopentylglycol dimethacrylate, 1,6 hexanediol diacrylate, 1,3 butylene dimethacrylate, trimethylolpropane triacrylate, pentaerythritol triacrylate, pentaerythritol tetraacrylate, etc.

Other vinyl containing compounds which are polymerizable with the above-discussed organic resins upon introduction of ionizing radiation, are divinyl and tetravinyl compounds such as those disclosed by U.S. Pat. Nos. 3,586,527; 3,586,528; and 3,586,530. These compounds are formed by first reacting a diepoxide or monoepoxide with acrylic acid and/or methacrylic acid and then subsequently reacting the resultant ester condensation product with a saturated acylhalide. The divinyl and tetravinyl compounds disclosed in these patents are homopolymerizable and copolymerizable with each other and with various monovinyl monomers mentioned above.

Still other compounds polymerizable with the alpha-beta olefinically unsaturated resins may be employed as the second binder component. Included in such compounds are the alpha-beta unsaturated siloxanes taught in U.S. Pat. Nos. 3,577,262 and 3,577,263 as well as the alpha-beta unsaturated diurethanes of U.S. Pat. No. 3,585,065 formed by reacting an unsaturated diisocyanate with an unsaturated polyester.

C. MONO- OR DIESTER OF PHOSPHORIC ACID

The coating compositions of the invention include between about 1.0 and about 15.0 parts, preferably between about 3.0 and about 10.0 parts per 100 parts of the total of said alpha-beta olefinically unsaturated resin and the compound polymerizable therewith of a triester of phosphoric acid bearing one or more sites of vinyl unsaturation and having the formula:

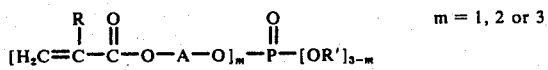

where:
R = H, Cl or $CH_3$
A = $C_nH_{2n}$, $2 \leq n \leq 6$
R' = $C_1$ to $C_4$ alkyl or $C_1$ to $C_4$ chloro- or bromoalkyl Representative of the various species of organo-phosphate esters falling within the above formula are: (1) tris (methacryloxyethyl) phosphate (R = $CH_3$; A = -$C_2H_4$-; m = 3); (2) tris (acryloyloxyethyl) phosphate (R = H; A = -$C_2H_4$-; m = 3); (3) dimethylmethacryloyloxyethyl phosphate (R = $CH_3$; A = -$C_2H_4$-; R' = $CH_3$; m = 1); (4) diethyl methacryloyloxyethyl phosphate (R = $CH_3$; A = -$C_2H_5$-; m = 1); (5) dipropyl acryloyloxyethyl phosphate (R = H; A = -$C_2H_4$-; R' = -$C_3H_7$-; m = 1); (6) methylbis (acryloyloxyethyl) phosphate (R = H, A = -$C_2H_4$-; m = 2; R' = $CH_3$); (7) ethylbis (acryloyloxyethyl) phosphate (R = H; A = -$C_2H_4$-; m = 2; R' = $C_2H_5$-); (8) methylbis (methacryloyloxyethyl) phosphate (R = $CH_3$; A = -$C_2H_4$-; m = 2; R' = $CH_3$); (9) ethylbis (methacryloyloxyethyl) phosphate (R = $CH_3$; H = -$C_2H_4$-; m = 2; R' = $C_2H_5$-); etc.

D. PHOTOINITIATORS

When the paint compositions of the invention are polymerized by exposure to ultraviolet radiation it may be desirable to include a photoinitiator or photosensitizer in the paint. The use of such photoinitiators and examples of various ones which may be employed will be discussed hereinafter in greater detail.

E. INERT SOLVENTS AND OTHER ADDITIVES

Inert solvents, i.e., solvents that do not enter into the polymerization or crosslinking reactions of the paint binder polymer/monomer system under normal exposure to radiation, can be added to the coating formulation to reduce viscosity and aid in control of application properties. Such solvents are normally selected to be substantially more volatile than the monomeric constituents of the paint formulation, thus allowing them to evaporate prior to irradiation of the coatings. Suitable solvents include, by way of example and not by way of limitation: toluene:butyl acetate; methylethyl ketone; isopropanol; benzene; tetrahydrofuran; dioxane, methylisobutyl ketone; methylene chloride; chloroform; ethylene chloride; trichloroethylene; trichloroethane; and mixtures thereof. Additional materials such as catalysts, pigments, plasticizers, etc., all of which are well known in the formulation of coating compositions and, in particular in the art of radiation polymerizable coating compositions, may be included in the coating compositions of the invention.

II. COATED ARTICLES AND PROCESSES FOR MAKING SAME

The radiation polymerizable paints discussed above display unusually good adhesion to a variety of substrates including wood, paper, glass, shaped polymeric surfaces and metal, particularly vapor deposited metal surfaces. In addition to these outstanding adhesion properties, the coatings of the invention also exhibit excellent water resistance and intercoat adhesion. The novel paint compositions of the invention, like prior art radiation polymerizable paints discussed above, may be applied to a variety of substrates by conventional means, e.g., brushing, spraying, roller coating, flow coating, etc., to an average thickness which is preferably in the range of from about 0.1 to about 4.0 mils depending on the substrate and the intended end use of the coated product.

The novel paint compositions of the invention may be cured or polymerized by exposure to radiation, preferably ionizing radiation or ultraviolet light. In either case, the paint compositions may be cured at relatively low temperatures, e.g., between room temperature (20° to 25° C) and the temperature at which significant vaporization of its most volatile component is initiated, (ordinarily between about 20° C and about 70° C).

The term "ionizing radiation" as employed herein means radiation having sufficient energy to remove an electron from a gas atom, forming an ion pair, and hence radiation with energy of, or equivalent to, about 5,000 electron volts. The preferred method of curing paint films of this invention by exposure to ionizing radiation is by subjecting such films to a beam of polymerization-effecting electrons which is at its source of emission within the range of, or equivalent to, 150,000 to 450,000 electron volts. In this method of curing, it is preferred to employ a minimum of 25,000 electron volts per inch of distance between the radiation emitter and the workpiece where the intervening space is occupied by air. Adjustment is made for the resistance of the intervening gas which is preferably an oxygen-free inert gas such as nitrogen, helium, or combustion products of natural gas. It is, however, within the scope of the use of ionizing radiation to effect polymerization using either that which is conventionally termed "high energy particle radiation" or "ionizing electromagnetic radiation".

When such ionizing radiation is employed to cure the paint compositions of this invention, the radiation energy is applied at dose rates of from about 0.1 to about 100 Mrads per second upon a preferably moving workpiece with the coating receiving a total dose in the range of from about 0.1 to about 100, preferably from about 1 to about 25 Mrads. The abbreviation "Mrads" as employed herein means 1 million Rads. The term "Rads" means that dose of radiation which results in the absorption of 100 ergs of energy per gram of absorber, e.g., coating film. The electron emitting means may be a linear electron accelerator capable of producing a direct current potentially in the range hereinbefore set forth. In such a device, electrons are ordinarily emitted from a hot filament and accelerated through a uniform voltage gradient. The electron beam, which may be about ⅛ inch in diameter at this point is scanned in one direction to make a fan-shaped beam and then passed through a metal window, e.g., a magnesium-thorium alloy of about 0.003 inch thickness.

As mentioned above, the radiation polymerizable coating compositions of this invention may also be cured by exposure to ultraviolet light. Preferably, paint compositions according to this invention which are cured by exposure to ultraviolet light contain little or no pigment. Upon exposure to light of wavelengths less than about 390 m$\mu$, most of the vinyl monomers employed in the paint compositions of this invention will fragment and produce radicals which can initiate polymerization. However, in order to make more efficient use of the output of high intensity UV sources and thereby attain a commercially feasible rate of cure, it is preferred to include a photoinitiator or photosensitizer in compositions to be cured by ultraviolet radiation.

Photoinitiators (or sensitizers) are substances, generally organic compounds which, upon exposure to light of appropriate wavelength, give rise to or promote the production of polymerization initiating species. It is preferred to employ a photoinitiator which decomposes to yield, or otherwise results in the production of, one or more free radical species upon exposure to light having a wavelength of less than about 380 m$\mu$. In order for any photochemical reaction to occur, there must be some overlap between the wave length of light incident upon the reaction medium (the coating) and the wave length absorbed by the photoinitiating species. Thus, the selection of an appropriate photoinitiator depends not only upon its efficacy as a polymerization initiator, but also upon the light source(s) used.

Many different types of free-radical initiators and sensitizers have been studied in acrylic systems and these are well known in the art. The rate of cure of the paint compositions of this invention, is, of course, a function of the type of initiator and its concentration, the intensity of incident light of appropriate wavelength and the type and concentration of polymerization inhibitors. Also, the detailed compositions of the coating formulation can have a significant effect on the rate of cure, especially at low exposure levels. Thus, in the end analysis, the amount of ultraviolet radiation which is necessary to achieve the desired properties in the final film formed from the paint compositions of this invention will vary with the composition of the paint itself and one of ordinary skill in this art will be able to determine the optimal exposure to UV light in view of the various factors discussed above with a minimum of experimentation.

Included among the many suitable photoinitiators are: organic carbonyl compounds such as acetone, benzophenone, benzanthrone, benzoin, benzoin methyl ether, 2,2-diethoxyacetophenone, 2,2-dimethoxy-2-phenylacetophenone, benzoin n-butyl ether and benzoin iso-butyl ether; peroxides such as hydrogen peroxide, di-t-butyl peroxide, ergosterol peroxide and benzoyl peroxide; organic sulphur compounds such as diphenyl disulfides, dibenzoyl disulfides and dibenzothiazol disulfides; and azo compounds such as 2,2'-azobis-(2-methylpropionitrile), $\alpha,\alpha'$-azobisisobutylronitrile, azomethane, azothane, $\alpha$-azobis-1-cyclohexane carbonitrile; and other well known initiators such as 2-ethylhexyl-2-cyano-3,3-diphenylacrylate. Based on availability, solubility in the coating composition of this invention, freedom from color and efficiency of curing at minimal UV exposure levels, the preferred photoinitiators are 2,2-diethoxyacetophenone, benzophenone and 2-ethylhexyl-2-cyano-3,3-diphenylacrylate. The amount of each photoinitiator necessary to suitably initiate polymerization in the paint compositions of this invention when curing by exposure to UV light will be apparent to those skilled in the art. It has been found, however, that generally the presence of a photoinitiator in the amount of from about 0.5 to about 5.0 parts per 100 parts of the total reactive vehicle solids in the paint composition will produce adequate curing upon exposure to a low pressure ultraviolet lamp.

A. COATED ARTICLES INCLUDING VAPOR DEPOSITED METALS

As discussed above, the coating compositions of this invention are particularly suited as abrasion and corrosion resistant protective coatings for surfaces bearing vapor deposited metals. Such coated articles bearing vapor deposited metals are a particularly preferred embodiment of this invention since they are suitable for use as a substitute for plated metal surfaces used for trim or brightwork on the exterior of automobiles.

Vapor deposition of metals, and in particular vacuum metallizing, is a simple and relatively low cost process by which thin layers of metals are deposited on prepared surfaces of substrates such as metal, plastic, glass, paper and other materials. Surfaces bearing vapor deposited metals, and in particular plastic substrates bearing thin deposits of aluminum, have been considered as a substitute for plated metal surfaces used for trim or brightwork on the exterior of automobiles. Since vapor deposition of metals produces very attractive surfaces and is substantially less expensive than processes for metal plating, such as chrome plating, it would appear to be ideally suited for producing such trim or brightwork. However, due to severe abrasion and corrosion problems, articles produced by vapor depositing metals have not been deemed suitable for exterior automotive use. The coating compositions of this invention, when applied over the surface of such vapor deposited metals afford the protection necessary to overcome this problem.

Vapor deposition of metals is well known and the detailed procedures will be apparent to those skilled in the art. Physical vapor deposition, the process most commonly used for decoration of plastics, involves formation of the coating by physical means alone. Two of the most commonly used techniques, i.e., resistive heating and electron beam heating, involve stepwise heating in vacuum, first melting and then vaporizing the material to be deposited. Other well known techniques such as sputtering may also be employed. The choice of methods depends to some extent on the material to be deposited. A review of physical vapor deposition techniques may be found in Vapor Deposition, C. F. Powell, J. H. Oxley and J. M. Blocker, Jr., eds., John Wiley & Sons, Inc. New York (1966), p. 221 ff. Resistive heating of a tungsten filament or basket or of a refractory crucible is commonly used for vapor deposition of aluminum, the most common evaporant for deposition on plastic parts. Electron beam heating of an evaporant contained in a suitable crucible or hearth is recommended for deposition of alloys and metals which have low vapor pressures or which form alloys with conventional filaments or crucibles at normal evaporating temperatures. Iron-chrome alloys can be deposited best using electron-beam heating techniques or sputtering.

Chemical vapor deposition techniques, also discussed in Powell et al, can in principle also be used in the formation of the composite coated articles of this invention. Such techniques involve the transfer of material across temperature or concentration gradients between the substrate and the surrounding atmosphere and formation of coatings by chemical reactions at the surface of the substrate. Chemical vapor deposition techniques often involve heating of the substrate to moderately high temperatures to form the final metallic coating. Application of these techniques is thus restricted to those substrates capable of withstanding the required process conditions.

B. PREFERRED PLURAL COATED EMBODIMENT

The preferred coated article of this invention is prepared by: applying a base coat to a substrate and curing the coating; vapor depositing a metal layer on the base coat; applying the coating composition of this invention over the metallized surface; and curing the coating with radiation.

C. BASE COAT COMPOSITIONS

The base coat fills minor surface imperfections of the substrate, provides a high-gloss surface to receive the metal deposit, improves adhesion of the deposit, and reduces the quantity of gas liberated from the substrate at reduced pressures. In selecting a base coat it is thus important that the composition display good intercoat adhesion, i.e., adhere well to both the substrate and the metal layer. Many base coat compositions useful in metal vapor deposition processes are known in the art and one of ordinary skill in the art will, of course, select the composition best suited for the substrate and metal vapor being used. However, certain lacquers and radiation polymerizable base coats are preferred for the preferred plural coated embodiment of this invention.

The lacquers and the radiation polymerizable compositions preferred as base coats in the process of this invention may be applied by conventional means, e.g., spray coating, dip coating, flow coating, etc., to an average thickness which is preferably in the range of from about 0.1 to about 4.0 mils. The lacquers preferred as base coats are well-known in the prior art and may be air dried or heat cured. Most bake-curing lacquers cure in 1–3 hours at temperatures ranging from 140° to 180° F. The radiation polymerizable base coats may be cured at relatively low temperatures, e.g., between room temperature (20° to 25° C) and the temperature at which significant vaporization of its most volatile reactive component is initiated, (ordinarily between about 20° C and about 70° C). The radiation energy is applied at dose rates of from about 0.1 to about 100 Mrads per second upon a preferably moving workpiece with the coating receiving a total dose in the range of from about 0.1 to about 100, preferably from about one to about 25 Mrads. It will be appreciated that the use of radiation polymerizable base coats will substantially lessen the processing time necessary for producing the plural coated articles of the invention.

The lacquer base coats which are preferred are well-known in the art of vapor deposition, and in particular vacuum metallizing, and consist essentially of a thermoplastic or thermosetting resin in a volatile solvent. Representative of the organic resins which may be employed individually or in combination to formulate such a lacquer are: acrylic resins, alkyd resins (pure and modified), polyesters, conventional varnishes, urea-formaldehyde resins, vinyl polymers, acrylonitrile polymers, phenolic resins, cellulosic resins, polyurethanes, butyl rubber and chlorinated butyl rubber, silicone resins, melamine-formaldehyde resins, cellulosic resins, polyurethanes, butyl rubber and chlorinated butyl rubber, silicone resins, melamine-formaldehyde resins, polyestyrenes, natural rubber, and modified phenolic resins. Numerous base coats employing such organic resins are commercially available.

Radiation polymerizable base coat compositions which are preferred for use in the process and articles of this invention include a coating formulation including an alpha-beta olefinically unsaturated urethane modified organic resin discussed above and disclosed in U.S. Pat. No. 3,437,514. That composition, exclusive of non-polymerizable solvents, pigments and other non-reactive components consists essentially of: (1) between about 90 and about 10 parts, preferably between about 70 and about 30 parts, of the alpha-beta olefinically unsaturated urethane modified organic resin; and (2) between about 10 and about 90, preferably between about 30 and about 70 parts of vinyl solvent monomers. The alpha-beta olefinically unsaturated urethane modified organic resin is formed by reacting a diisocyanate monomer and an organic resin having in its molecular structure a plurality of hydrogen atoms which are labile with respect to the isocyanate group, e.g., a labile hydrogen of an amine, amide, alcohol or carboxylic acid, and subsequently reacting the product with a hydroxylated vinyl monomer. The organic resin used in this preparation may be a polyester or a resin formed by copolymerization of acrylic monomers, i.e., acrylic and methacrylic acids as well as esters formed therefrom. Exemplary of the many diisocyanates which may be employed to form the alpha-beta olefinically unsaturated resins are: 2,4 tolylene diisocyanate, 65/35-Tolylene diisocyanate, 80/20 Tolylene diisocyanate, 4,4'-diphenyl-methane diisocyanate, dianisidine diisocyanate, Tolidene diisocyanate, hexamethylene diisocyanate, etc.

The formulation of various polyesters, such as hydroxy terminated polyesters and polymers or copolymers formed from acrylic monomers and bearing functional groups which will react with the diisocyanate compounds are well known in the art.

Another preferred formulation for use as a base coat in this invention is disclosed in U.S. Patent Application Ser. No. 500,828 filed Aug. 26, 1974 and entitled "Protective Coating Composition, Plural Coated Article and Process for Preparing Same - A." That formulation, exclusive of non-polymerizable solvents, pigments and other non-reactive components consists essentially of a solution of: (1) between about 90 and about 10 parts, preferably between about 70 and about 30 parts, of a saturated, thermoplastic, vinyl polymer prepared from at least about 85 weight percent of monofunctional vinyl monomers; and (2) between about 10 and about 90 parts, preferably between about 30 and about 70 parts, of vinyl solvent monomers for said vinyl polymer, at least about 10 weight percent of said solvent monomers being selected from the group consisting of divinyl monomers, trivinyl monomers, tetravinyl monomers and mixtures thereof.

The saturated, thermoplastic, vinyl resin polymers useful in the base coat composition may be prepared from a single vinyl monomer or from mixtures of vinyl monomers by conventional polymerization techniques, e.g., suspension, emulsion, bulk or solution polymerization using conventional free radical initiators such as peroxides and hydroperoxides as well as azobis (isobutyronitrile). Preferred monomers for preparation of the vinyl homopolymer or copolymer resins are monofunctional monoacrylates and monomethacrylates as well as monovinyl hydrocarbons. The most preferred monomers are esters of acrylic or methacrylic acid and $C_1C_8$ monohydric alcohols, e.g., methyl methacrylate, butyl methacrylate, butyl acrylate, 2-ethylhexyl acrylate, cyclohexyl acrylate and mixtures thereof. Monovinyl hydrocarbons suitable in forming polymers are styrene and substituted styrenes, such as alpha-methyl styrene, vinyl toluene, t-butyl styrene, chlorostyrene and mixtures thereof.

As indicated above, the saturated thermoplastic vinyl resin polymers or copolymers useful in the base coat formulation of the invention should be formed from at least 85 weight percent of monofunctional vinyl monomers. However, difunctional monovinyl monomers such as acrylic and methacrylic acids, acrylamide, methacrylamide, 2-hydroxyethyl methacrylate, methacryloxyethyl phosphate and 2-acrylamido-2-methylpropanesulfonic acid, may be used as a minor component of the polymer, i.e., up to a combined total of about 15 weight percent. The incorporation of such monomers may be desirable in some cases to provide a measure of polarity to the coating resin. However, it should be recognized that a concomitant effect of increased polarity is increased water sensitivity. Thus, it is preferred not to employ such polar monomers in the preparation of the paints of this invention unless necessary for the particular application.

The essentially linear, gel-free thermoplastic polymers formed from the preferred monomers set forth above should have number average molecular weights ($\overline{M}_n$) of less than about 250,000 but not less than about 2,000. Preferred values lie between about 3,000 and about 100,000 with most preferred values being between about 5,000 and about 50,000.

While this base coat composition may include mixtures of polymers or copolymers formed from vinyl monomers as discussed above, it is preferred that the paint solution contain little or no alpha-beta olefinically unsaturated resins as conventionally employed in radiation-curable paint resins discussed above. Even though the properties of the paint, particularly adhesion properties, will be affected by its inclusion, up to 5 weight percent based on the total polymer and solvent monomer of such alpha-beta olefinically unsaturated resins may be tolerated.

At least about 10 weight percent and preferably at least about 15 weight percent of the vinyl solution monomers of this base coat formulation of the invention are selected from the group consisting of divinyl monomers, trivinyl monomers and tetravinyl monomers. These di-, tri-, and tetravinyl compounds are preferably acrylates, methacrylates or vinyl hydrocarbons. The most preferred are esters of acrylic or methacrylic acids and polyhydric $C_2$-$C_8$ alcohols, e.g., neopentylglycol dimethacrylate, 1,6-hexanediol diacrylate, 1,3-butylene dimethacrylate, trimethylolpropane triacrylate, pentaerythritol triacrylate, and pentaerythritol tetraacrylate. Other divinyl monomers which may be employed are disclosed in U.S. Pat. Nos. 3,586,528; 3,586,529; 3,586,530; 3,586,531; and 3,595,687. These divinyl compounds are formed by reacting either a monoepoxide or diepoxide with acrylic acid or methacrylic acid and subsequently reacting the resultant ester condensation product with a saturated acyl halide or a vinyl unsaturated acyl halide. Further tetravinyl compounds which may be employed are disclosed in U.S. Pat. Nos. 3,586,526; 3,586,527; and 3,591,626. These tetravinyl compounds are formed by reacting a diepoxide with acrylic acid and/or methacrylic acid and then subsequently reacting the resultant ester condensation product with a vinyl unsaturated acylhalide.

The remainder of the vinyl solvent monomers used to form this base coat in combination with the saturated, thermoplastic vinyl resin polymers or copolymers discussed above may be monofunctional, monovinyl monomers such as those used in the preparation of the polymer or copolymer.

A further base coat formulation for use in the process and articles of this invention is disclosed in U.S. Pat. Application Ser. No. 537,736, filed Dec. 31, 1974 now U.S. Pat. 3,957,918 and entitled "Protective Coating Composition, Plural Coated Article and Process for Making Same - D." The coating formulation disclosed in that application differs from that discussed in the first above-mentioned application by the inclusion in the composition of between about 1.0 and about 15.0 parts, preferably between about 3.0 and about 10.0 parts, per 100 parts of the total of the saturated, thermplastic resin and the vinyl monomer solvent of the same triesters of phosphoric acid which are included in the compositions of this application.

A final base coat composition which may be employed in making the preferred plural coated articles of this invention is a composition which is the same as that disclosed and claimed in the first above-mentioned application with the exception that the composition includes between about 0.05 and about 1.0 parts, preferably between about 0.1 and about 0.6 parts, and still more preferably between about 0.2 and about 0.5 parts, per 100 parts of the total of the saturated thermoplastic polymer and the vinyl solvent monomer, of a mono- or diester of phosphoric acid having the formula:

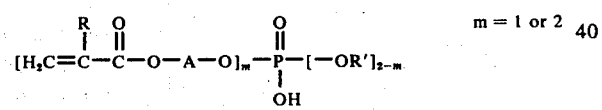

where:
R = $H_1$, Cl or $CH_3$
A = $C_nH_{2n}$, $2 \leq n \leq 6$
R' = H, $C_1$ to $C_4$ alkyl or $C_1$ to $C_4$ bromo- or chloroalkyl It should be appreciated that it is within the scope of this invention as defined above to employ various combinations of the various polymers in preparing the various coating compositions. Therefore, it should be understood that the following specific examples are presented by way of illustration and not by way of limitation.

EXAMPLE I a. A vinyl monomer comprising polymer is prepared from the following reactants:

|  | Parts by Weight |
|---|---|
| A. Methyl methacrylate | 328 |
| B. Ethyl acrylate | 549 |
| C. Glycidyl methacrylate | 123 |
| D. Azobisisobutyronitrile | 10 |
| E. Hydroquinone | 0.4 |
| F. Tetraethyl ammonium bromide | 3.6 |
| G. Methacrylic acid | 74.5 |
| H. Xylene (solvent) | 1000 |

To a reaction vessel equipped with a stirrer, condenser, thermometer and nitrogen inlet and exit tubes is charged the xylene which is then heated to a reflux temperature (138° C). To the refluxing xylene is added a mixture of components A, B, C and D. Heating of the reaction mixture is then continued at 135° C for 4 hours after which the reaction mixture is cooled to 90° C. After cooling, components E, G and F are added in that order and the temperature increased to 135° C. The reaction is then continued until an acid number of less than 1 is obtained after which the xylene solvent is removed by vacuum distillation.

b. A coating composition is prepared from the following components:

|  | Parts by Weight |
|---|---|
| Unsaturated acrylic resin from (a) | 55 |
| Neopentyl glycol diacrylate | 10 |
| 2-ethyl hexyl acrylate | 14 |
| Tris (methacryloyloxyethyl) phosphate | 2.0 | c. The components of the composition are mixed together, reduced to spray viscosity (15 sec. Ford cup No. 4) with a 1:1 mixture of toluene and butyl acetate, sprayed on plastic substrates coated with vacuum deposited aluminum and cured by electron beam irradiation at:

| Average current density | 275 Kilovolts |
|---|---|
| Current | 30 Milliamps |
| Dose | 7 Mrads |
| Atmosphere | Nitrogen and carbon dioxide mixed (less than 1% oxygen) |

The coating so obtained displays excellent adhesion, no softening or color change, and the underlying metal is similarly unaffected by 240 hours exposure to water at 90° F. No failure is observed after 168 hours in a 5% salt spray corrosion test booth (ASTM Test No. B-117).

EXAMPLE II

The procedure of Example I is repeated except that the tris (methacryloyloxyethyl) phosphate is omitted. The cured coatings exhibit very poor adhesion (coatings fail taped cross-hatch adhesion tests) and allow removal of the underlying metal adjacent to a scribed line when the coated article is subjected to the salt spray exposures.

EXAMPLE III

The procedures of Example I are followed with the exception that 7.0 parts of dimethyl methacryloyloxyethyl phosphate is used as the triester and that the unsaturated acrylic resin is prepared in the following manner:

| Step I Terpolymer | Parts by Weight |
|---|---|
| (1) Methylmethacrylate | 100 |

-continued

| Step I Terpolymer | Parts by Weight |
|---|---|
| (2) Butyl acrylate | 60 |
| (3) Glycidyl methacrylate | 40 |
| (4) t-Butyl Peroctoate | 8 |
| (5) Xylene | 300 |

A mixture of items (1), (2), (3) and (4) is added dropwise over a 2-hour period to a reaction flask (equipped with a condenser, thermometer, agitator, and dropping funnel) containing (5) maintained at reflux with a nitrogen sparge throughout. The solution is maintained at reflux for at least 4 hours after addition is complete.

| Step II Adduct | Parts by Weight |
|---|---|
| (6) Hydroquinone | 0.1 |
| (7) Acrylic acid | 24.3 |
| (8) Tetraethyl amine | 0.7 |

(6) is added to the solution from Step I. The unsaturated acid (7) and catalyst (8) are added to the refluxing solution. The esterification reaction is continued at reflux until 90–95% of (7) is consumed. The polymer so obtained has a molecular weight ($\overline{M}_n$) of 3,000.

The coating so obtained displays excellent adhesion to a variety of substrates including metal, vapor deposited metals, wood, glass and polymeric substrates. The coating displays excellent adhesion to vapor deposited stainless steel and does not soften or change color upon 240 hours immersion in water at 90° F.

EXAMPLE IV

A coating composition is prepared in accordance with the procedures of Example III with the exception that 3 parts per 100 parts of reactive solids in the coating of 2,2 diethoxyacetophenone is added. This coating composition is applied to a substrate comprising a surface of vapor deposited alloy of iron and chrome (80% Fe/20% Cr) and cured by exposure to UV light. The coating exhibits excellent abrasion and water resistance.

EXAMPLE V

The procedure of Example IV is repeated with the difference that (1) an equimolar amount of styrene is substituted for methyl methacrylate in the preparation of the vinyl monomer comprising polymer; and (2) 10.0 parts of methylbis (acryloyloxyethyl) phosphate are employed. The coatings adhere well to metal substrates and provide adequate corrosion resistance.

EXAMPLE VI

A coating composition is prepared from the following components:

|  | Parts by Weight |
|---|---|
| Unsaturated acrylic resin prepared in Example I | 55 |
| 1,6 hexanedioldiacrylate | 10 |
| 2-ethylhexyl acrylate monomer | 15 |
| diethylmethacryloyloxyethyl phosphate | 6.0 |

The above components are mixed, reduced to spray viscosity (15 sec Ford Cup N . 4) with a 1:1 mixture of toluene and butyl acetate sprayed on panels of vapor deposited aluminum and antimony and cured by electron beam irradiation at:

| Average current density | 275 Kilovolts |
|---|---|
| Current | 30 Milliamps |
| Dose | 7 Mrads |
| Atmosphere | Nitrogen and carbon dioxide (Less than 1% oxygen) |

The films formed from the above composition display excellent adhesion and corrosion resistance when immersed in a 5% aqueous solution of sodium chloride for a period of 30 days. The films also display no softening or color change, and the underlying metal is similarly affected by 240 hours exposure to water at 90° F.

EXAMPLE VII

A coating composition is prepared in accordance with Example VI except that 2 parts by weight of alpha 2,2 diethoxyacetophenone are included.

The film forming composition so obtained is applied to a substrate and cured thereon by exposure for 3 minutes in a nitrogen atmosphere to radiation from a low pressure mercury lamp (intensity about $4 \times 10^{16}$ photons sec.$^{-1}$ cm.$^{-2}$, major UV peak at 2537 angstroms) at a distance of 1 inch. The cured coating displays adhesion to metal and vapor deposited aluminum and solvent and water resistance essentially equivalent to those of a comparable electron beam curing coating.

EXAMPLE VIII

To 75 parts by weight of a paint binder solution comprising an alpha-beta olefinically unsaturated polyester resin prepared in accordance with Example I of U.S. Pat. No. 3,437,514 is added 1.25 parts of tris(acryloyloxyethyl) phosphate. The binder solution is mixed, applied to a vacuum metallized substrate and cured by electron beam irradiation. The resultant coatings adhere well and provide adequate protection in a 5% salt spray.

EXAMPLE IX

To 75 parts by weight of the silicone-modified polyester paint binder resin prepared in accordance with Example XV of U.S. Pat. No. 3,437,514 is added 5.0 parts by weight of dipropylacryloyloxyethyl phosphate and 1.3 parts by weight of 2-ethylhexyl 1-2 cyano 3,3-diphenylacrylate. The resin binder solution is mixed, applied to a plastic substrate bearing a vapor deposited metal layer and cured by exposure to UV irradiation. The coatings adhere well and provide adequate protection upon water immersion and exposure to a 5% salt spray.

EXAMPLE X

To 90 parts by weight of each of the paint dispersions prepared in accordance with Example I of U.S. Pat. No. 3,660,145 is added 11.5 parts by weight of ethylbis(acryloyloxyethyl) phosphate. The dispersions are applied to metal substrates by spraying and cured by electron beam irradiation. The coatings adhere well and provide adequate protection upon water immersion and exposure to 5% salt spray.

EXAMPLE XI a. An alpha-beta olefinically unsaturated urethane modified organic resin is prepared from the following components:

|  | Mole Percent | Wt. Percent |
|---|---|---|
| (1) Adipic acid | 24 | 28.0 |
| (2) Maleic anhydride | 8 | 5.6 |
| (3) Neopentylglycol | 38 | 31.1 |
| (4) Hexamethylenediisocyanate | 16 | 22.1 |
| (5) 2-hydroxyethyl acrylate | 14 | 13.2 |

Components (1), (2) and (3) are charged to a reaction vessel equipped in the usual way for a polyester synthesis (i.e., so that water can be removed during the course of the reaction) and heated gradually to 230° C. When an acid value less than 16 is obtained (average reaction time 4.5 hours), the mixture is cooled to 150° C and 0.04 weight percent hydroquinone is added. The mixture is further cooled to below 100° C and reduced to 70% solids with butyl acrylate.

Component (4) is added at room temperature and the mixture is heated at 60-70° C until an isocyanate level of 5% is obtained.

Component (5) is added at 70° C and the mixture is heated at 80–100° C until the isocyanate is essentially completely reacted. The mixture is reduced to 60% solids with equal parts 2-hydroxyethyl acrylate and butyl acrylate.

b. A coating composition is prepared from the following components:

|  | Parts by Weight |
|---|---|
| (1) Resin solution from (a) | 65 |
| (2) 2-ethylhexyl acrylate | 25 |
| (3) Neopentylglycol diacrylate | 10 |
| (4) Methylbis(methacryloyloxyethyl) phosphate | 3.5 | c. The above components are mixed, applied to plastic substrates bearing vapor deposited aluminum and cured by electron beam irradiation in a nitrogen atmosphere at:

|  |  |
|---|---|
| Average current density | 295 Kilovolts |
| Current | 20 Milliamps |
| Total Dose | 10 Mrads |

The resultant films are abrasion resistant and the metallized surface does not corrode after immersion of a scribed panel in water at 90° F and immersion in a 5% salt spray.

EXAMPLE XII

A plural coated article including a vacuum deposited metal layer is prepared as follows:

A. Preparation and Application of Base Coat

| Step I Preparation of Polymeric Intermediate | | |
|---|---|---|
|  | Mole Percent | Wt. Percent |
| (1) Adipic Acid | 24 | 28 |
| (2) Maleic Anhydride | 8 | 5.6 |
| (3) Neopentyl glycol | 38 | 31.1 |
| (4) Hexanethylenediisocyanate | 16 | 22.1 |
| (5) 2-hydroxyethylacrylate | 14 | 13.2 |

Components (1), (2) and (3) are charged to a reaction vessel equipped in the usual manner for polyester synthesis (i.e., so that water can be removed during the course of the reaction) and heated gradually to 230° C. When an acid value of less than 16 is obtained (average reaction time 16 hours), the mixture is cooled to 150° C and 0.04 weight percent hydroquinone is added. The mixture is further cooled to below 100° C and reduced to 70% solids with butyl acrylate.

Component (4) is added at room temperature and the mixture heated at 60–70° C until an isocyanate level of 5% is obtained.

Component (5) is added at 70° C and the mixture heated at 80°–100° C until the isocyanate is completely reacted. The mixture is reduced to 60% solids with equal parts of 2-hydroxyethylacrylate and butylacrylate.

| Step II Preparation of the Coating Formulation | |
|---|---|
|  | Parts by Weight |
| (1) Resin Solution from I | 60 |
| (2) 2-ethylhexylacrylate | 10 |
| (3) hydroxyethylacrylate | 20 |
| (4) methylmethacrylate | 40 |

The listed components are mixed in indicated proportions by weight, sprayed on a plastic substrate and cured with an electron beam in a nitrogen atmosphere at 280 KV, 40 ma, total dose of 10 Mrads.

B. A layer of 430 stainless steel is deposited on the base coat by conventional vapor deposition technique employing electron beam heating of the evaporant.

C. Preparation and Application of Top Coat

| Step I Preparation of Alpha-Beta Olefinically Unsaturated Resin | |
|---|---|
|  | Parts by Weight |
| (1) Methyl methacrylate | 328 |
| (2) Ethylacrylate | 549 |
| (3) Glycidyl methacrylate | 123 |
| (4) Azobisisobutyronitrile | 10 |
| (5) Hydroquinone | 0.4 |
| (6) Tetraethyl ammonium bromide | 3.6 |
| (7) Methacrylic acid | 74.5 |
| (8) Xylene (solvent) | 1000 |

To a reaction vessel equipped with a stirrer, condenser, thermometer and nitrogen inlet and exit tubes is charged the xylene which is then heated to a reflux temperature (138° C). To the refluxing xylene is added a mixture of components (1), (2), (3) and (4). Heating of the reaction mixture is then continued at 135° C for 4 hours after which the reaction mixture is cooled to 90° C. After cooling, components (5), (6) and (7) are added in that order and the temperature increased to 135° C. The reaction is then continued until an acid number of less than 1 is obtained after which the xylene solvent is removed by vacuum distillation.

| Step II Preparation of the Top Coat Formulation | |
|---|---|
| | Parts by Weight |
| Unsaturated Acrylic Resin from I | 55 |
| Neopentylglycoldiacrylate | 10 |
| 2-ethylhexyl acrylate | 14 |
| ethylbis(methacryloyloxyethyl) phosphate | 14 |

The above components of the formulation are mixed together, reduced to spray viscosity (15 sec., Ford cup No. 4) with a 1:1 mixture of toluene and butyl acetate, sprayed on the vapor deposited metal surface and cured by electron beam irradiation (average current density — 275KV; current —30ma; Dose —7 Mrads; atmosphere — Nitrogen and carbon dioxide mixed less than 1% oxygen).

The resultant metallized article passes cross-hatch adhesion tests, can withstand a minimum of 50 rubs with a cloth soaked in methylethyl ketone. Also, the plural coated article is unaffected by immersion in water at 90° F for 240 hours and 10 day immersion in a 5% aqueous sodium chloride solution.

EXAMPLE XIII

The procedure of Example XII is repeated with the exception that: (1) The top coat formulation is prepared by adding 12.5 parts of tris(methylacryloyloxyethyl) phosphate to 75 parts by weight of a paint binder solution comprising an alpha-beta olefinically unsaturated polyester resin prepared in accordance with Example I of U.S. Pat. No. 3,437,514; and (2) The top coat formulation is applied to the metallized surface by flow coating. The resultant plural coated article exhibits excellent adhesion properties and is not affected by 240 hours exposure to either water at 90° F or a 5% aqueous sodium chloride solution.

EXAMPLE XIV

The procedure of Example XII is repeated with the exception that the unsaturated acrylic resin is prepared in the following manner:

| Step I Preparation of the Terpolymer | |
|---|---|
| | Parts by Weight |
| (1) Methylmethacrylate | 100 |
| (2) Butylacrylate | 60 |
| (3) Glycidyl methacrylate | 40 |
| (4) T-butyl peroctoate | 8 |
| (5) Xylene | 300 |

A mixture of items (1), (2), (3) and (4) is added dropwise over a two-hour period to a reaction flask equipped with condenser, thermometer, agitator and dropping funnel and containing (5) maintained at reflux for at least 4 hours after the addition is complete.

| Step II - Preparation of the Adduct | |
|---|---|
| | Parts by Weight |
| (6) Hydroquinone | 0.1 |
| (7) Methacrylic acid | 24.3 |
| (8) Tetraethylamine | 0.7 |

(6) is added to the solution from Step I. The unsaturated acid (7) and catalyst (8) are added to the refluxing solution. The esterification reaction is continued at reflux until 90–95% of (7) is consumed. The polymer so obtained has a molecular weight ($\overline{M}_n$) of 3,000.

The plural coated article passes cross-hatch adhesion tests, withstands at least 50 rubs with a cloth soaked in methylethyl ketone and shows no deleterious effects from exposure to water at 90° F and an aqueous 5% salt solution for 240 hours.

EXAMPLE XV

The procedure of Example XII is repeated with two exceptions: (1) the base coat composition is prepared from commercial electron beam polymerizable resins as follows:

| | Parts by Weight |
|---|---|
| (1) RD 2107-30* | 40 |
| (2) RD 2278-58* | 20 |
| (3) Hydroxyethylacrylate | 50 |
| (4) Methylmethacrylate | 10 |

*Both of these resins are unsaturated polyurethanes manufactured by Hughson Chemical Company of Erie, Pennsylvania. (1) is supplied as a solution of 80% polymer, 20% 2-ethylhexylacrylate, (2) is supplied as a solution of 70% polymer, 15% methyl methacrylate, and 15% 2-ethyl-hexylacrylate; and (2) 4.0 parts of dimethyl acryloyloxyethyl phosphate are employed as the organophosphate ester component.

(1) is supplied as a solution of 80% polymer, 20% 2-ethylhexylacrylate, (2) is supplied as a solution of 70% polymer, 15% methyl methacrylate, and 15% 2-ethylhexylacrylate; and (2) 4.0 parts of dimethyl acryloyloxyethyl phosphate are employed as the organophosphate ester component.

The coated article so obtained passes cross-hatch adhesion tests and can withstand a minimum of 50 rubs with a cloth soaked in methylethyl ketone. The surface coating does not soften or change colors and the underlying metal is similarly unaffected by 240 hours exposure to water at 90° F. No failure is observed in 240 hours immersion in a 5% aqueous sodium chloride solution.

EXAMPLE XVI

The procedure of Example XII is repeated with the exception that: (1) an equimolar amount of styrene is substituted for methylmethacrylate in the preparation of the vinyl monomer comprising polymer; and (2) 7.0 parts of ethylbis (acryloyloxyethyl) phosphate are employed. The plural coated article is of comparable quality with that of Example XII.

EXAMPLE XVII

The procedure of Example XII is repeated with the exception that the base coat comprises a commercially available base coat lacquer Red Spot SM 1817 sold by Red Spot Paint and Varnish Company and including a urealkyd type polymer. The base coat is applied to the substrate and cured by heating for 90 minutes at 170° F. The plural coated article withstands a minimum of 50 rubs with a cloth soaked in methyl ethyl ketone, passes cross-hatch adhesion tests and exhibits no deleterious effects from exposure for 240 hours to either water at 90° F or a 5% aqueous solution of sodium chloride.

EXAMPLE XVIII

A plural coated article is prepared as follows:

A. The same base coat as applied in Example XVII is applied to a plastic substrate by dip coating and cured by heating to 170° F for 90 minutes.

B. An iron/chrome alloy layer (80% Fe/20% Cr) is applied by conventional vapor deposition techniques.

C. A top coat having the following formulation is prepared:

|  | Parts by Weight |
|---|---|
| (1) Unsaturated acrylic resin prepared in Example XII. | 55 |
| (2) 2-ethylhexyl acrylate monomer | 15 |
| (3) 1,6 hexanedioldiacrylate | 10 |
| (4) diethyl methylacryloyloxyethyl phosphate | 8 |

The above components are mixed, reduced to spray viscosity (15 sec. Ford Cup No. 4) with a 1:1 mixture of toluene and butylacetate, sprayed on the vapor deposited surface and cured by exposure to electron beam irradiation at:

| Average Current Density | 275 KV |
|---|---|
| Current | 30 ma |
| Dose | 7 Mrads |
| Atmosphere | Nitrogen and carbon dioxide (less than 1% oxygen) |

The resultant plural coated article passes cross-hatch adhesion tests, withstands a minimum of 60 rubs with a cloth soaked in methylethyl ketone and is not affected by exposure for 240 hours to either water at 90° F or a 5% aqueous solution of sodium chloride.

EXAMPLE XIX

A plural coated article is prepared as follows:

A. A lacquer base coat, Red Spot SM 1817 is flow coated onto a plastic substrate and cured;

B. An aluminum layer is applied to the base coat surface by conventional vacuum deposition technique.

C. A top coat having the same composition as employed in Example XIV except for the use of 7.0 parts of diethylacryloyloxyethyl phosphate as the organosphosphate additive is sprayed onto the metallized surface and cured by exposure to an electron beam (9 Mrad dose).

The resultant plural coated article exhibits good adhesion as well as excellent solvent resistance and corrosion resistance.

EXAMPLE XX

The procedure of Example XIX is repeated with the exception that the top coat is prepared by adding 6.0 parts of diethylacryloyloxyethyl phosphate to 75 parts by weight of the silicone-modified polyester solution prepared in accordance with Example XV of U.S. Pat. No. 3,437,514. The resultant plural coated article is of comparable quality with the article of Example XIX.

EXAMPLE XXI

A plural coated article is prepared as follows:

A. Preparation and application of Base Coat Formulation.

An electron beam polymerizable coating is prepared from the following materials in the manner hereinafter set forth:

| Step I Preparation of resin | Parts by Weight |
|---|---|
| (1) Water | 150 |
| (2) Triton X200* | 5.2 |
| (3) 1% aqueous $K_2S_2O_8$ | 30 |
| (4) Methyl methacrylate | 300 |
| (5) Water | 270 |
| (6) Triton X200* | 3.5 |
| (7) Triton X305* | 10.7 |
| (8) $K_2S_2O_8$ | 1.2 |
| (9) Octanethiol | 2.1 |

*Triton X200, a product of Rohm & Haas Co., is an anionic surfactant containing 28% active component (the sodium salt of an alkyl aryl polyester sulfonate).
**Triton X305, a product of Rohm & Haas Co., is a nonionic surfactant containing 70% active component (an alkyarylpolyether alcohol averaging 30 ethylene oxide units).

Items 1 and 2 are charged to a reactor provided with a condenser, a thermometer, an agitator, and a dropping funnel. The mixture is boiled to remove dissolved oxygen, and cooled slightly to 90° C. Item 3 is added. A mixture of the remaining ingredients is then added slowly over a period of about 40 minutes while maintaining the reaction mixture at reflux. Following the monomer addition, the mixture is maintained at reflux for an additional 2 hours.

The latex so obtained is cooled and coagulated by adding it dropwise to three volumes of rapidly stirred methanol heated to about 40° C. The polymeric precipitant is isolated by filtration, washed with methanol, dried in vacuo and used in the subsequent preparation of coating materials. The polymer molecular weight ($\overline{M}_n$) is about 10,000.

| Step II Formulation of Coating | Parts by Weight |
|---|---|
| (1) Polymer from Step I | 24.2 |
| (2) Neopentylglycol diacrylate | 36.4 |
| (3) 2-ethylhexyl acrylate | 39.4 |
| (4) Butyl acetate | 40 |
| (5) Toluene | 40 |
| (6) Methyl ethyl ketone | 10 |
| (7) Isopropanol | 10 |

A solution of polymer is prepared using the above-listed monomers and solvents. The film-forming solution so obtained is applied to a plastic substrate and is cured thereon under an inert atmosphere by electron beam irradiation using a total dosage of 9 Mrads (voltage 275 kv., current 40 ma).

B. An aluminum layer is applied to the base coat by conventional vapor deposition technique.

C. The same top coat as employed in Example XII is applied to the metallized surface by flow coating.

The resultant plural coated article displays excellent adhesion properties and withstands at least 50 rubs with a cloth soaked in methyl ethyl ketone. The article also is not adversely affected by exposure for 240 hours to either water at 90° F or a 5% aqueous sodium chloride solution.

EXAMPLE XXII

A plural coated article is prepared as follows:

A. A base coat having the following formulation is applied to an ABS (acrylonitrile-butadiene-styrene copolymer) plastic substrate and cured by electron beam irradiation:

| | Parts by Weight |
|---|---|
| (1) Acryloid B82 | 50 |
| (2) Pentaerythritol triacrylate | 100 |

The solution is adjusted to spray viscosity by dilution with a mixture of butyl acetate, toluene, methyl ethyl ketone and isopropanol in proportion by weight 4:1:1:1.

B. A layer of type 430 stainless steel is applied to the surface of the base coat by conventional vacuum deposition technique employing electron beam heating of the evaporant.

C. A top coat having the same formulation as in Example XIV is applied to the metallized surface by spraying and cured by exposure to electron beam irradiation.

The resultant plural coated article passes cross-hatch adhesion tests and withstands a minimum of 50 rubs with a cloth soaked in methylethyl ketone. The article is also not adversely affected by exposure for a period of 240 hours to water at 90° F or a 5% aqueous sodium choride solution.

EXAMPLE XXIII

A plural coated article is prepared as follows:
A. Preparation and application of Base Coat
The base coast composition is formulated from the following materials:

| | Parts by Weight |
|---|---|
| (1) Acryloid B48N* (solids basis) | 35 |
| (2) 2-ethylhexylacrylate | 30 |
| (3) Neopentylglycol diacrylate | 35 |

*Acryloid B48N is marketed by Rohm & Haas Co. and is described as a methyl methacrylate copolymer having a glass transition temperature of 50° C. It is supplied as a 45% by weight solution in toluene at Brookfield viscosity of 6,000 to 10,000 at 25° C. The number average molecular weight is about 15,000. The composition is reduced to spray viscosity using an inert solvent mixture of toluene, methyl ethyl ketone, butyl acetate, and isopropanol in a ratio of 4:4:1:1, sprayed on a metal substrate and cured by electron beam irradiation.

B. An aluminum layer is applied to the base coat surface by conventional vacuum deposition technique.

C. Top coat formulations are prepared by adding 6.0 parts by weight of ethylbis (acryloyloxyethyl) phosphate to the coating dispersions formed in accordance with Example I of U.S. Pat. No. 3,660,145. The plural coated articles formed by applying each of the top coats so formed to the metallized surface and curing by electron beam irradiation all exhibit good adhesion properties and withstand a minimum of 50 rubs with a cloth soaked in methyl ethyl ketone. The articles also withstand exposure for 240 hours to both water at 90° F and a 5% sodium chloride solution.

EXAMPLE XXIV

A plural coated article is prepared as follows:
A. A base coat having the following formulation is prepared:

| | Parts by Weight |
|---|---|
| (1) Elvacite 6011* (40% solids in a 30/70 mixture of acetone and toluene) | 40.0 |
| (2) Trimethylolpropane triacrylate | 24.0 |
| (3) Hydroxypropylacrylate | 8.0 |
| (4) 2-ethylhexylacrylate | 16.0 |
| (5) Methyl ethyl ketone | 12.0 |

*Elvacite 6011 is a methyl methacrylate polymer manufactured by DuPont. The inherent viscosity of a solution of .25 grams polymer is 50 ml chloroform measured at 25° C in a No. 50 Cannon-Fenske viscometer is .34.

The above materials are mixed together and the formulation reduced to spray viscosity (No. 1 Zahn Cup, 40 secs) with a 1:1 mixture of toluene and butyl acetate. The formulation is then sprayed onto a plastic substrate and cured by electron beam irradiation.

B. An antimony layer is applied to the base coat surface by conventional vacuum deposition technique.

C. A top coat formulation is prepared as follows:
a. An alpha-beta olefinically unsaturated urethane modified organic resin is prepared from the following components:

| | Mole Percent | Wt. Percent |
|---|---|---|
| (1) Adipic Acid | 24 | 28.0 |
| (2) Maleic anhydride | 8 | 5.6 |
| (3) Neopenthylglycol | 38 | 31.1 |
| (4) Hexamethylenediisocyanate | 16 | 22.1 |
| (5) 2-hydroxyethyl acrylate | 14 | 13.2 |

Components (1), (2) and (3) are charged to a reaction vessel equipped in the usual way for a polyester synthesis (i.e., so that water can be removed during the course of the reaction) and heated gradually to 230° C. When an acid value less than 16 is obtained (average reaction time 4.5 hours), the mixture is cooled to 150° C and 0.04 weight percent hydroquinone is added. The mixture is further cooled to below 100° C and reduced to 70% solids with butyl acrylate.

Component (4) is added at room temperature and the mixture is heated at 60°–70° C until an isocyanate level of 5% is obtained.

Component (5) is added at 70° C and the mixture is heated at 80°–100° C unti the isocyanate is essentially completely reacted. The mixture is reduced to 60% solids with equal parts 2-hydroxyethyl acrylate and butyl acrylate.

b. A coating composition is prepared from the following components:

| | Parts by Weight |
|---|---|
| (1) Resin solution from (a) | 65 |
| (2) 2-ethylhexyl acrylate | 25 |
| (3) Neopentylglycol diacrylate | 10 |
| (4) Dimethyl acryloyloxyethyl phosphate | 3.5 |

The above materials are mixed, reduced to spray viscosity and sprayed on the metallized surface. The resultant plural coated article passes cross-hatch adhesion tests and exhibits good solvent resistance and corrosion resistance.

EXAMPLE XXV

The procedure of Example XXI is repeated with the exception that 5.0 parts of diethyl methacryloyloxyethyl phosphate are included in the base coat formulation. The plural coated article is comparable to that of Example XXI.

EXAMPLE XXVI

The procedure of Example XXII is repeated with the exception that 7.5 parts of ethylbis (acryloyloxyethyl) phosphate are included in the base coat formulation. The plural coated article is comparable to that of Example XXII.

EXAMPLE XXVII

The procedure of Example XXII is repeated with the exception that 0.25 parts of methyl (2-methacryloyloxyethyl) phosphate are included in the base coat formulation. The plural coated article is comparable to the article of Example XXII.

EXAMPLE XXVIII

The procedure of Example XXIII is repeated with the exception that 0.4 parts of ethylmethacryloyloxyethyl phosphate are included in the base coat formulation. The plural coated article is of comparable quality to that of Example XXIII.

It will be understood by those skilled in the art that modifications can be made in the foregoing examples and within the scope of the invention as hereinbefore described and hereafter claimed.

We claim:

1. In a coating composition polymerizable by ionizing radiation which, exclusive of non-polymerizable solvents, pigments, initiators and other nonreactive components, consists essentially of a solution of: (1) an alpha-beta olefinically unsaturated organic resin containing between about 0.5 and about 5 units of unsaturation per 1000 units of molecular weight; and (2) a vinyl compound polymerizable with said resin upon exposure to radiation, the improvement comprising including in said paint from about 1.0 to about 15.0 parts per 100 parts of the total of said organic resin and said compound polymerizable with said resin of a triester of phosphoric acid which bears one or more sites of vinyl unsaturation and has the formula:

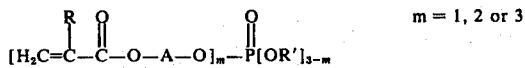

$$[H_2C=C(R)-C(O)-O-A-O]_m-P(O)[OR']_{3-m} \quad m = 1, 2 \text{ or } 3$$

where:
R=H, Cl or $CH_3$
A=$C_nH_{2n}$, $2 \leq n \leq 6$
R' = $C_1$ to $C_4$ alkyl or $C_1$ to $C_4$ chloro- or bromo-alkyl.

2. A coating composition in accordance with claim 1 wherein said organophosphate ester is selected from the group consisting of: (1) tri(methacryloyloxyethyl) phosphate; (2) tris(acryloyloxyethyl) phosphate; (3) dimethyl methacryloyloxyethyl)phosphate; (4) diethylmethacryloyloxyethyl)phosphate; (5) dipropylacryloyloxyethyl)phosphate; (6) methylbis (acryloyloxyethyl)phosphate; (7) ethylbis (acryloyloxyethyl)phosphate; (8) methylbis (methacryloyloxyethyl)phosphate; and (9) ethylbis (methacryloyloxyethyl)phosphate.

3. A coating composition in accordance with claim 1 wherein said triester of phosphoric acid is included in an amount ranging from about 3.0 to about 10.0 parts by weight per 100 parts of the total of said organic resin and said compound polymerizable with said resin.

4. A coating composition in accordance with claim 1 wherein said compound polymerizable with said resin comprises a solution of vinyl monomers.

* * * * *